May 12, 1953     W. M. PATTERSON     2,638,429

METHOD OF FORMING COMPOSITE JOINT CONSTRUCTION

Filed March 26, 1948

Wallace M. Patterson
*INVENTOR.*

BY James M. Clark

HIS PATENT ATTORNEY

Patented May 12, 1953

2,638,429

UNITED STATES PATENT OFFICE 2,638,429

METHOD OF FORMING COMPOSITE JOINT CONSTRUCTION

Wallace M. Patterson, Penn Wynne, Pa., assignor to Kellett Aircraft Corporation, a corporation of Delaware Application March 26, 1948, Serial No. 17,354

8 Claims. (Cl. 154—116)

The present invention relates generally to composite constructions formed by adhering or joining two or more elements and the processes or methods utilized in assemblying the same. The invention relates more particularly to joint construction and the methods of securing or joining elements in an assembly by means of potentially expandable and adherable component materials interposed between the elements.

In recent years, adhesive and cementing compositions and materials have been developed which are capable of providing satisfactory adhesion or bonding to metals and other components of such highly stressed structures as aircraft. These new adhesives and cements have supplanted, to a great extent, older methods and types of joints in many applications in the aircraft and other fields. The growth of such use of adhesive assemblies has, however, been obstructed to a great extent by several inherent difficulties which have not been overcome in the joint constructions and methods available up to the present time. There have been two major restraints to the increased use of adhesives and cements, namely, that much difficulty has been experienced with other than flat plate assemblies, in getting sufficient pressure at all points to provide uniform adhesion. Further, the inability of thin 'glue lines' to adequately distribute stresses which tend to concentrate at the ends of the glue areas as a result of differential straining and unbalanced loading have also presented difficult problems. The difficulty of supplying uniform pressures has resulted in unpredictable joint strengths, local instabilities and a resultant distrust of adhesive assemblies generally for highly loaded applications. The effect of stress concentration has been to limit the use of adhesive joining to very thin sheet metal, since the results of stress concentration at the ends of the joints, is to limit the effective length of laps to such an extent that the full strength of the sheet can only be developed for gauges up to approximately $\frac{1}{32}$ of an inch in thickness.

The improved composite or joint construction and methods of assembly comprising the present invention have overcome the foregoing difficulties and has provided a very satisfactory joint construction which is not subject to the limitations of the prior adhesive and cemented joints. The present invention also is such that the strength of a proposed joint can be predicted within a reasonable degree of accuracy, directly from the results of a similar joint of different lap length, material, or metal thickness. In a present embodiment, the improved method might consist essentially of interposing, between adhesively coated joint members, an adhesively coated, resin impregnated and compressed, but incompletely cured wood, or other product capable of expansion followed by the application of heat for a selected cycle of time and temperature, while the joint members are restrained from movement, either by their own configuration, or by external fixtures. Upon the application of heat, the special filler, or interponent element tends to swell to its uncompressed thickness. When restraint is applied, it swells until complete contact has been made with all surfaces to be bonded and thereafter, exerts a high uniform pressure. Continued application of heat polymerizes both the impregnating resins of the filler interponent and of the high strength adhesive, resulting in a stable joint made under ideal pressure conditions. The presently improved joint, and the process utilized in obtaining it, differ from former joints and processes in that the means of obtaining the pressure is developed within the bond rather than external to it, and in that the completed assembly includes a "glue line" having many times the elasticity of the normal glue line of the joints constructed by prior methods.

It is, accordingly, a major object of the present invention to provide an improved joint construction for securing or joining two or more members, and the utilization of an improved method or process in accomplishing the same. It is a further object to provide an improved joint construction and method of assembly by means of a potentially expandable medium interposed between the members or elements to be joined. It is a further object of the present invention to provide means for securing parts together without recourse to the close tolerances heretofore required by methods utilizing adhesive, brazing, keyed, or similar assemblies. A corollary objective is the provision of a joint without the necessity of absolute dimensional matching, or the need for surface smoothness and contour perfection of the mating parts. A further objective is the formation of an assembly by means of high frictional pressures exerted upon activation by the potentially expandable medium.

It is a still further object of the present invention to provide an improved joint construction in which the material is expanded to fill matching cavities in the members to be joined, and to thereby provide an assembly held together by the structural strength of the material and by a combination of the strength of the material and the frictional forces created by the expansive pressure. It is also an object to provide such a joint, the strength of which is contributed to by the combination of the strength of the material, the frictional forces of expansion, and the bonding force of an added adhesive. It is another object to provide an adhesive joint of relatively great flexibility which effectively relieves stress concentrations and permits the development of the full yield strength of thicker joint materials than has heretofore been possible. A still further object of this invention is the provision of means for reducing or eliminating the local tension field stress which occurs at the edges of a soldered, brazed, welded or adhesive assembly resulting from the contraction of the joining material on solidification or curing, thereby reducing the fatigue strength of the assembly. A still further object of the present invention resides in the provision of an improved joint construction by virtue of an expansive pressure created on restraint of the free expansion of the filler, or other interponent, utilized in the improved method, whereby local compression fields will exist at the edges of the joint, creating a beneficial condition for resisting the effects of repeated loading.

Other objects and advantages of the present invention will become apparent to those skilled in the art after reading the present description together with the accompanying drawings, forming a part hereof, of which:

Figure 1:
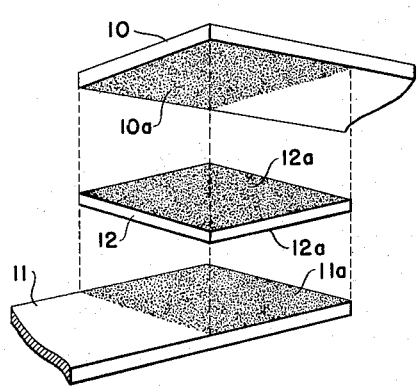
Fig. 1 is a separated perspective view of the component parts of a lap joint for flat elements about to be joined by the improved method of the present invention.

Referring now to Fig. 1, the numeral 10 represents a flat element which it is desired be joined to an adjacent terminal of a similar flat element 11. An expandable interponent element 12 is cut to the predetermined area corresponding to that of the contacting faces of the upper and lower flat elements 10 and 11. The filler or interponent element 12, preferably comprises a potentially expandable material which is reasonably stable under normal conditions, but which is capable—upon activation by heat, chemical or other means—of developing a dimensionally unstable state, allowing a relatively large expansion, or if restrained, producing a considerable pressure. Under certain conditions, it is desirable to provide a combination of expansion and pressure which can be controlled to a predetermined extent by controlling the nature and extent of the restraining means, such as a clamp, vise, press or other work holding device.

The potentially expandable material of the interponent element 12 is preferably a compressed wood which is secured in the compressed state by the gelation of incompletely polymerized impregnated resins. A phenolic impregnated birch veneer which has been warmed, compressed to a specific gravity of about 1.3, and cooled under pressure, has been used with very satisfactory results. The material in this condition or state is metastable, in that it will retain its compressed dimensions under normal storage conditions, but if subjected to moisture or moderate temperature the material will tend to expand to its original thickness. With conditions optimum for expansion, it will, if restrained, exert back pressures of several hundred pounds per square inch. This expansive property can be released upon activation of the material by heat, and the degree of pressure produced depends upon the amount of original compression and the amount of restraint while the material is being activated. Upon the continued application of heat, the impregnated resins become fully polymerized and a stable partially compressed wood, with corresponding properties, results.

The contacting surface areas of the two flat elements 10 and 11, as well as the surfaces of the interponent expandable material 12, are each coated with an adhesive which is indicated by the numerals 10a, 11a and 12a. This adhesive is preferably a high strength metal-to-metal adhesive. Such adhesives are usually pressure sensitive and require a relatively high positive pressure during the curing process to achieve uniform bonding and full potential strength. A large number of known adhesives is adapted for use in the present joint structure, the major requisites being that the adhesives used have adequate strength and other characteristics compatible with this of the joint and the members joined, and also that the adhesive be capable of withstanding the temperatures and pressures which are developed in the curing of the joint. For high strength metal-to-metal adhesion, the use of adhesives having a phenol-formaldehyde base resin, or one containing phenol-formaldehyde resin, have been found to give satisfactory results. Good results have been obtained with "Cycleweld C-3" adhesive which is a polymerizable resin adhesive available from the Chrysler Corp., of Detroit, Mich. This adhesive or cement bonds itself strongly to metal when polymerized at a temperature of approximately 325° F. for about fifteen minutes and for a more complete description and understanding of its properties and use reference is made to U. S. Patent No. 2,376,854 which issued May 22, 1945, to Saunders et al. For complete bonding at all points, such pressure must exist at all of these points, regardless of surface irregularities and flow of the adhesive during curing. In the usual pressure application system, which does not follow-up relative movement of the parts to be joined as the adhesive goes through a comparatively low viscosity stage during the cure, the requirements for such complete bonding are not provided. In molded, glued plywood structures, this uniform pressure at all points and the necessary follow-up is generally obtained by the application of pneumatic pressure within a flexible bag. In metal-to-metal molding, the required pressures are too high for this technique to be practical and other methods and processes have been resorted to. By the use of the interposed expandable medium such as the interponent 12 in the lap joint shown in Fig. 1, I have supplied these requirements through the ability of the interponent to expand and to fill all glue line irregularities to thereafter follow-up changes in the film thickness resulting from flow of the adhesive and to exert a high pressure after its expansion has been restrained or opposed. Further heating stabilizes the material after its expansion-pressure function has been completed.

Figure 2:
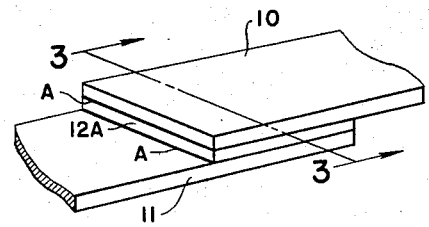
Fig. 2 is an assembled perspective view of the joined assembly of the parts shown in Figure 1.

Referring further to Figs. 1 and 2, the contacting surfaces of each of the overlapping plate elements 10 and 11 are brought together against the interposed expandable element 12 with the adhesive coated surface of each in contact with the other until the relationship shown in Fig. 2 is obtained. The contacting assembly is then placed in a clamp or other work holding or restraining means and the assembly subjected to activation from a suitable heat source. By heating the assembly at 350° F. for twenty minutes, the interponent element 12 will tend to expand to its original thickness to thereby bring about the application of the desired pressure, and the heat also completes the polymerization of the impregnating and adhesive resins. The temperature and time duration have been cited as an example only and will be subject to adjustment and variation depending upon the particular materials which are selected for use. It will also be noted that by proper predetermined positioning of the restraining means, whereby limited predetermined clearances are provided for the expansion of the interponent material, wide variation in the pressures developed may be obtained within the joint. The percentage of expansion of the interponent materials may be tested and determined prior to heating and curing, and a typical material $\frac{1}{16}$ of an inch in thickness, when activated for ten minutes within the heating oven at a curing temperature of 300° F. displayed a percentage of expansion of 50%.

Figure 3:
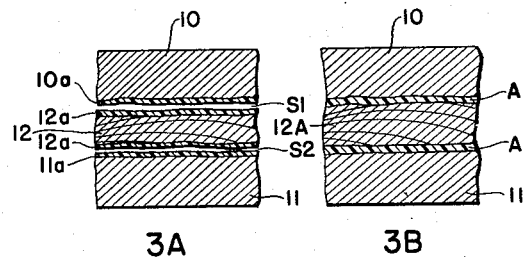
Fig. 3 is an enlarged cross-sectional view of the component parts of the lap joint shown in Figs. 1 and 2, along the lines 3—3 of the latter.

Referring now to Fig. 3, which is a composite cross-sectional view as taken along the lines 3—3 of Fig. 2, the portion 3A shows the joint when the contacting surfaces are first brought into registry, and the portion 3B shows the joint after it has been completed and cured. In portion 3A it will be noted that the overlapping plate elements 10 and 11 are in the same relative position as in Fig. 2, in that the underside of the upper element is coated with adhesive at 10a and the upper face of the lower element similarly coated with adhesive at 11a. The interponent expandable element 12 is coated upon both its upper and lower surfaces with the adhesive material as at 12a. In the example which has been selected in this figure, the three elements 10, 11 and 12 are shown restrained in a spaced position such that a relatively small clearance space S1 occurs between the adhesive coatings 10a and 12a, and a similar space S2 occurs between the coatings 11a and 12a. The clamp or other restraining means has not been shown in Fig. 3, but can of course be of any conventional type capable of withstanding the pressures which are developed within the joint.

After the joint assembly has been activated by the application of heat and the joint completed and cured, the cross section of the material will appear as in the portion 3B of this figure. It will be seen that the expandable material 12A has increased in thickness considerably and that the adhesive coatings have been compressed and combined, as indicated at A. As the result of the relatively large expansion available, a uniformity of pressure is obtained in the joint shown in Fig. 3B, and as a consequence, an adhesion of high degree is obtained without the necessity of absolute dimensional matching, surface smoothness and contour perfection of the mating parts. The inclusion of the expandable medium as a portion of the glue line increases its elasticity many fold and so improves the distribution of stresses such that very much greater laps, or overlapping areas, can be effectively used than with prior methods.

Figure 4:
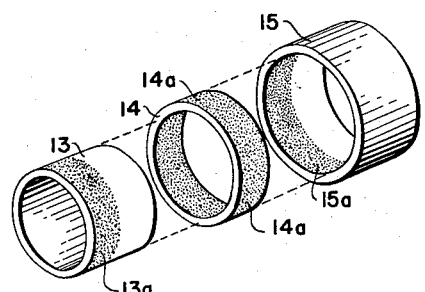
Fig. 4 is a separated perspective view of the component parts of a telescoping joint for tubular elements.

Referring now to Fig. 4, there is shown a plurality of tubular elements 13, 14 and 15 which are adapted for joining in a coaxially telescoping relationship. Unlike the joint assembly which has been shown and described in connection with the first three figures, the present joint assembly requires no external pressure or restraining means, but the assembly clearance must be compatible with the available expansion of the expandable interponent element 14. The outer surface of the end of the inner element 13 is coated with the adhesive as at 13a and the interponent element 14 is coated both externally and internally with the same adhesive material as at 14a. The internal end surface of the outer tubular element 15 is similarly coated at 15a and the three elements are brought into their predetermined telescoped relationship, after which they are placed in the heating oven and subjected to the desired activation. In making a telescopic joint of the type shown in Fig. 4, sufficient clearance must be supplied in order to provide a proper joint, the clearance and the thickness of the expandable interponent 14 being chosen so that not more than one half of the available expansion is used up in closing the clearance between the elements, the potential swelling of the other half being reserved for the development of the desired pressure, which is opposed by the tension developed within the outer element 15. It will be obvious that thicker fillers or interponent elements permit of greater clearance for assembly, and under these conditions bonds of approximately 1700 pounds per square inch can be expected.

Figure 5:
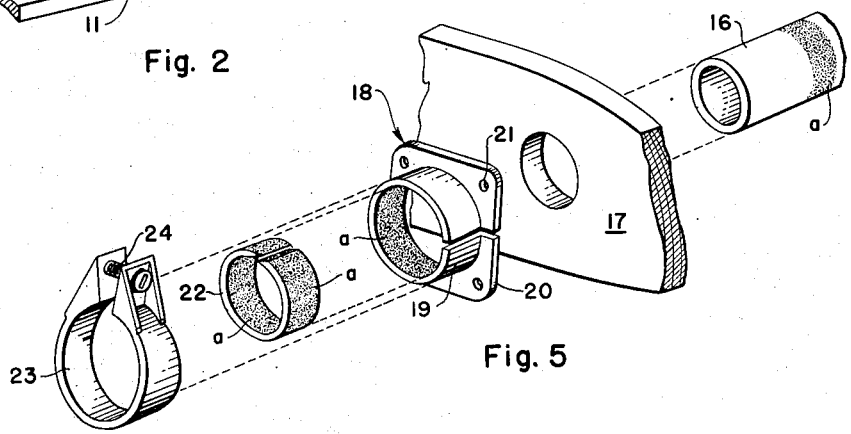
Fig. 5 is a similar separated view of a form of the present invention as applied to the components of a rotor spar assembly.
Figure 6:
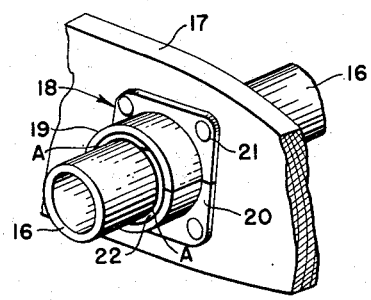
Fig. 6 is an assembled perspective view of the joined assembly of the component parts shown in Fig. 5.

A further method of assembly which combines features of the joint construction and method shown and described in connection with the preceding figures, is shown in Figs. 5 and 6 applied to a rib collar for a rotor spar assembly such as used in the construction of the rotating blades of helicopters and other rotative wing aircraft. The spar tube is indicated by the numeral 16 and will be understood to extend in a spanwise direction from the hub mounting of the blade to the region of its tip portion. At predetermined points along the length of the spar 16, it is customary to provide a plurality of chordwise extending ribs, one of which is indicated at 17. Inasmuch as relatively high forces are transmitted between the spar and the aerodynamic surfaces supported by the ribs 17, it is essential that the latter be attached to the spar with a joint construction of relatively high strength yet one which is not of great weight. A split collar 18 has a cylindrical hub portion 19 of a predetermined larger diameter than that of the spar 16, has fixedly attached thereto a flange 20 having apertures 21 for suitable fastening means, for the attachment of the rib to the flange 20. A similarly split collar formed of a strip of expandable material comprises the interponent 22 which is adapted to be fitted with a predetermined clearance over the outside diameter of the spar tube 16 and within the inside diameter of the hub 19 of the split collar 18. The external restraint for this spar joint is provided by the clamp 23 adapted to be fitted over the outside diameter of the hub portion 19 and to be tightened by the screw 24.

The outer surface of the tube 16, the inner and outer surfaces of the interponent 22 and the inner surface of the hub 19 are coated with the adhesive material $a$ in the same manner as that described in connection with the telescoping components of the joint shown in Fig. 4 and the several elements are then brought into their telescoped and registered relationship. The clamp 23 is then applied to the external surface of the hub 19 of the split collar 19 and the screw 24 tightened to the predetermined extent at which the desired pressure will be developed within the activated joint as contributed to by the nature and the thickness of the interponent element and the clearances which have been provided in the assembly. The joint assembly is then subjected to the predetermined application of heat, or such other activation as the application of a chemical or of moisture, and when the curing has been completed the temporary clamp 23 can be removed, the adhesive bond being indicated at A. While the clearances referred to in determining the pressures developed are necessary to permit assembly, it will be noted that these clearances are not critical and the fits in a joint assembly of the type shown in Figs. 5 and 6 are not difficult or exacting. In such joints, a suitable means of providing a back-up pressure such as the clamp 23 should be provided and where a number of such joints are to be made, a series of tests can be run to determine the optimum back-up pressures.

There has, accordingly, been shown and described in the spar joint assembly of Figs. 5 and 6 a typical example of a satisfactory adhesive joint of the type described. In this application, the thermo-setting adhesive which is coated upon the metal spar tube and a metal rib collar, as well as that of the interponent piece of compressed and impregnated, but unstabilized wood, provides an adhesive joint of extremely high strength-to-weight ratio. The application of heat then liquifies the resin allowing the treated wood to swell, to fill completely the space between the spar and the collar and to exert a pressure comparable to the pressures exerted in the original pressure process of the prepared interponent material. Continued application of heat polymerizes both the resins in the adhesive and the impregnating resins of the wood, resulting in a stable joint made under the ideal pressure conditions which are provided by the expandable interponent.

The improved joint construction and methods of the present invention present numerous advantages and improvements over those constructions and processes which have heretofore been available. The present joint construction does not require perfect dimensional joint matching and also obviates the need for complicated jigs or presses for obtaining the desired pressures. It also exhibits a comparative insensitivity to the degree of restraining pressure and it is possible to make high strength adhesive joints where no external source of pressure is possible, such as in a self-restraining tubular joint of the type shown in Fig. 4. High static strengths are obtained and bonding at all points occurs, and thus obviates failures attributable to local instabilities from spotty adhesion. Furthermore, the incorporation of the elastic filler interponent results in a bond of many times the flexibility of an ordinary adhesive joint, effectively relieves stress concentration and results in making it possible to develop the full yield strength of far heavier gauge joint members than has heretofore been possible.

While there has been shown and described structures and methods wherein both faces of the joint members and both faces of the interponent element have been coated with the adhesive material, it will be obvious that sufficient adhesive coating of any single face of a pair of contacting surfaces will also obtain the advantages of the present invention. In other words, referring to Fig. 1, the two surfaces $12a$ of the interponent 12 may be the only surfaces coated, or alternatively only the surfaces $10a$ and $11a$ of the joint members, or it may alternatively be desired to coat one surface of the interponent element and a surface of one of the joint members with which that coated interponent surface does not come in contact. It is also pointed out that other expandable mediums than treated wood will produce satisfactory joints of the improved type and this invention is not necessarily limited thereto. The present improved composite or joint structures and methods are applicable to either cold-setting, contact adhesives or adhesives having other characteristics, and while they have been illustrated and described for expanatory purposes in joints of relatively small area, this invention is also applicable in the production of large sheets or panels of composite or laminated construction.

I claim:

1. In the formation of a composite construction in which an interponent element is pressure-adhered between a pair of metallic elements, the method of forming the composite construction which comprises the steps of impregnating a wood veneer with a phenolic resin, compressing said wood veneer in a warm state to a specific gravity of about 1.3, securing said wood veneer in the compressed state by the gelation of incompletely polymerized impregnated resins to form an interponent element, applying a pressure-sensitive adhesive coating to said interponent element, positioning said coated interponent element between a pair of metallic elements, applying restraining means for combining and holding said assembly of elements, and heating said assembly of elements for the release of the expansible forces within the compressed wood veneer of said interponent element and the adherence of said assembly of elements into a composite construction.

2. The method of joining a pair of adjacent elements using an expandable joining material comprising the steps of impregnating wood veneer with a phenolic resin, warming said impregnated wood veneer, compressing said impregnated wood veneer in said warm state, cooling said impregnated wood veneer in its compressed metastable state, applying an adhesive coating to said impregnated wood veneer, inserting said impregnated wood veneer in said compressed metastable state between a pair of elements to be joined, applying restraining means for confining and holding said assembly without applying external pressure, and applying heat to said assembly for the release of the expansive forces within said joining material for effecting the joining of said elements.

3. A method of joining a pair of adjacently spaced structural elements comprising impregnating a wood veneer with a phenolic resin, compressing said wood veneer at an elevated temperature at which said phenolic resin is plastic to reduce substantially the volume of the wood veneer, cooling said wood veneer while in said reduced volume to a temperature at which said phenolic resin is temporarily solidified and retains said wood veneer in a state of pre-compression, applying an adhesive coating to the surfaces of said pre-compressed cooled wood veneer, interpositioning said cooled wood veneer between said structural elements, applying restraining means about said superimposed structural elements and said interposed wood veneer without applying external pressure thereto, heating said wood veneer to a temperature at which said phenolic resin is plastic and at which it loses its temporary solidification causing the wood veneer to expand and place said superimposed elements and said interposed wood veneer under compression, and cooling said wood veneer to complete its adhesion to said structural elements to complete said juncture.

4. The method of forming a joint comprising impregnating a wood element with a phenolic resin impregnating material, compressing said wood element at a temperature at which said impregnating material is plastic to reduce the volume of the wood element, cooling said impregnated wood element to a temperature at which said impregnating material is temporarily solidified and holds the wood element in said reduced volume in a state of pre-compression, applying an adhesive coating to said pre-compressed wood element, placing a pair of pressure-sensitive adhesively coated outer elements to be joined in an adjacently spaced relationship with said adhesively coated pre-compressed wood element disposed between said first pair of outer elements, applying a restraining means against said outer elements opposing expansion of said intermediate element without applying external pressure thereto, and applying heat to all three said coated elements to a temperature at which said impregnating material is plastic for the release of said pre-compressed wood element to an expanded lesser compressed state and the expanded pressure adhesion of said elements into a fixed relationship.

5. In aircraft, a composite tubular joint construction including an inner tubular metallic spar element, an outer tubular metallic collar element co-axially disposed about said inner element, an interponent tubular wood veneer element impregnated in a warm compressed state with phenolic resin interposed between said inner spar element and said outer collar element, said interponent tubular wood veneer element secured in a potentially expansible compressed state by the gelation of incompletely polymerized impregnated resins, the said inner and outer elements being of a sufficiently rigid nature to oppose said expansive forces and restrain said interponent element, and pressure-sensitive resin adhesive means interposed between said inner spar element and said interponent element, and also between said interponent element and said outer collar element, characterized by the complete polymerization upon heating of the resins of said interponent element and said adhesive means arranged for pressure adhering all three said elements into a rigid composite tubular joint construction by the release of the expansive forces within said compressed wood veneer interponent material.

6. A tubular joint construction comprising an inner cylinder metallic element, an outer cylindrical metallic element having an inside diameter greater than the outside diameter of said inner metallic element, a cylindrical interponent element of wood veneer impregnated in a warm compressed state with phenolic resin interposedly disposed about said inner metallic element and within said outer metallic element, said interponent tubular wood veneer element secured in a potentially expansible compressed state by the gelation of incompletely polymerized impregnated resins, the said inner and outer elements being of a sufficiently rigid nature to oppose said expansive forces and restrain said interponent element, and pressure-sensitive adhesive layers on the inner and outer surfaces of said interponent element arranged for bonding all three said elements in said coaxially telescoped relationship by the release of the expansive forces within said compressed wood veneer interponent material.

7. A composite construction including a first metallic element, a second metallic element, an interponent wood veneer element impregnated in a warm compressed state with phenolic resin, said interponent element secured in a potentially expansible compressed metastable state by the gelation of an incompletely polymerized impregnated resin, pressure-sensitive resin adhesive coatings on the faces of said interponent element, the said first and second metallic elements restrained and held without application of external pressure on opposite sides of said adhesive-coated compressed metastable interponent element in an adjacent superimposed relationship therewith arranged for the pressure adherence of all three said elements upon heating and release of the expansive forces and the complete polymerization of the resins of said interponent element for effecting the joining of all of said elements into a composite construction.

8. The method of constructing a tubular joint composed of a pair of adjacent elements using an expansible joining material comprising the steps of placing said pair of tubular elements to be joined in a spaced telescoped relationship, impregnating a wood veneer with a phenolic resin, warming said impregnated wood veneer, compressing said wood veneer in its compressed metastable state, applying an adhesive coating to said impregnated wood veneer, inserting said impregnated wood veneer in said compressed metastable state between said spaced pair of adjacent telescoped tubular elements to form an assembly of said elements, applying restraining means for confining and holding said assembly without applying external pressure, and applying heat to said impregnated wood veneer for the release of the expansive forces therewithin for effecting the joining of said tubular elements in said telescoped relationship.

WALLACE M. PATTERSON.

References Cited in the file of this patent

UNITED STATES PATENTS

| Number | Name | Date |
| --- | --- | --- |
| 1,687,952 | Stander | Oct. 16, 1928 |
| 1,827,233 | Hughes | Oct. 13, 1931 |
| 1,827,267 | Short | Oct. 13, 1931 |
| 1,909,480 | Wilson | May 16, 1933 |
| 1,913,198 | Geyer | June 6, 1933 |
| 2,055,032 | Johnson | Sept. 22, 1936 |
| 2,181,136 | Knox | Nov. 28, 1939 |
| 2,252,299 | McCoy | Aug. 12, 1941 |
| 2,415,881 | Heftler | Feb. 18, 1947 |